United States Patent [19]

Murakami

[11] Patent Number: 5,793,501
[45] Date of Patent: Aug. 11, 1998

[54] CONTRAST CORRECTING APPARATUS

[75] Inventor: Shigeo Murakami, Kyoto, Japan

[73] Assignee: Dainippon Screen Mfg. Co., Ltd., Kyoto, Japan

[21] Appl. No.: 607,035

[22] Filed: Feb. 26, 1996

[30] Foreign Application Priority Data

Mar. 16, 1995 [JP] Japan ................... 7-084904

[51] Int. Cl.⁶ ................................. H04N 1/46
[52] U.S. Cl. ................. 358/520; 358/518; 358/523; 358/515; 358/522; 382/167
[58] Field of Search ................... 358/509, 515, 358/518, 520, 522, 523, 524, 530, 537; 382/166, 167

[56] References Cited

U.S. PATENT DOCUMENTS

| | | | |
|---|---|---|---|
| 4,812,903 | 3/1989 | Wagensonner et al. | 358/80 |
| 4,975,861 | 12/1990 | Fujimoto | 364/521 |
| 5,335,097 | 8/1994 | Murakami | 358/520 |

FOREIGN PATENT DOCUMENTS

| | | | |
|---|---|---|---|
| 0226959A2 | 1/1987 | European Pat. Off. | G06F 15/72 |
| 0327107A2 | 3/1989 | European Pat. Off. | H04N 1/46 |
| 0327107B1 | 3/1989 | European Pat. Off. | H04N 1/46 |
| 0322879A2 | 7/1989 | European Pat. Off. | H04N 1/40 |
| 0457427A2 | 11/1991 | European Pat. Off. | H04N 1/46 |
| 0 481 525 A2 | 4/1992 | European Pat. Off. | H04N 1/46 |
| 0 536 892 A1 | 4/1993 | European Pat. Off. | H04N 1/46 |
| 0 566 914 A1 | 10/1993 | European Pat. Off. | H04N 1/46 |
| 0457427B1 | 6/1995 | European Pat. Off. | H04N 1/46 |
| 6-14184 | 1/1994 | Japan | H04N 1/40 |
| 2117902 | 10/1983 | United Kingdom | G01N 21/27 |

*Primary Examiner*—Thomas D. Lee
*Assistant Examiner*—Jerome Grant, II
*Attorney, Agent, or Firm*—McDermott, Will & Emery

[57] ABSTRACT

An apparatus for correcting contrast of a selected range without changing lightness and color tone of a pixel designated as a central object of processing. The apparatus includes a frame memory for storing original image signals; a conversion table for converting the original image signals to CIE-Lab values; a data input device for designating a color to be corrected and to act as the central object of processing, a distance in CIE-Lab perceived color space indicating an effective range of processing, and a characteristic parameter for the processing; a lookup table for contrast correction; a lookup table initializer for matching input/output relations of the color to be corrected, and initializing the lookup table for other input/output relations based on the characteristic parameter; a mixing ratio computing unit for determining whether or not pixels in an original image are within the effective range, and computing a mixing ratio; and a mixing processor for mixing the original image signals and output data of the lookup table at the mixing ratio. The invention also includes an apparatus in which an effective range of contrast correction is designated with hue, saturation and lightness which are the three attributes of perceived color.

18 Claims, 6 Drawing Sheets

FIG.4
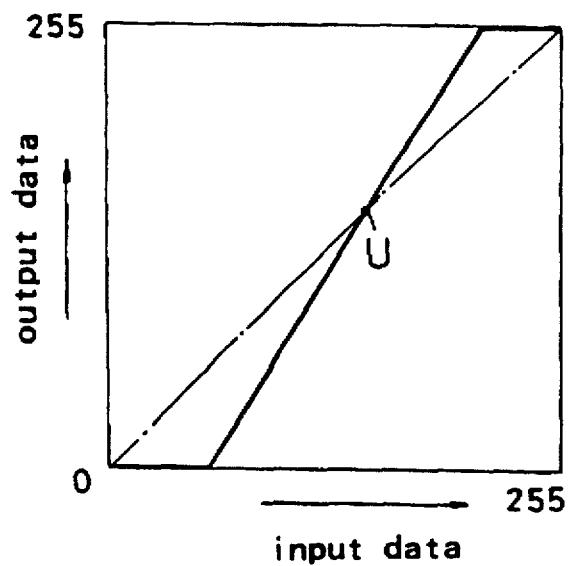
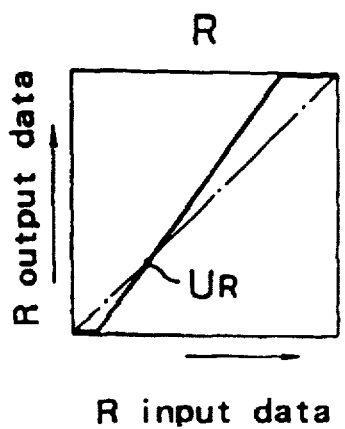
FIG. 5A
R
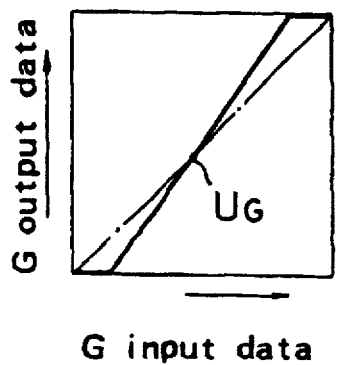
FIG. 5B
G
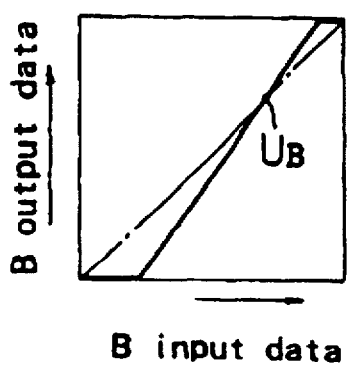
FIG. 5C
B

CONTRAST CORRECTING APPARATUS

BACKGROUND OF THE INVENTION (1) Field of the Invention

This invention relates to image contrast correcting apparatus, and more particularly to an apparatus for correcting contrast in a selected region of an original image.

(2) Description of the Related Art

As is well known, a correction of contrast or color tone exerts a great influence on the visual impression of an image. While such a correction may be made to the entirety of an original image, more often than not it is made to a particular region (e.g. a subject region or other region) of the original image. The following are known methods of selecting a particular region of an original image to be corrected:

(1) In one method, a pointing device such as a mouse is used to specify an outline of a particular region of an original image displayed on an image monitor. A correction is made to pixels in the specified region only. This method has a drawback of consuming a long time in a region selecting operation when that particular region has a complicated outline.

(2) In another method, a region in a color space is selected instead of the geometric region selection noted above, and a correction is made to pixels in the selected region only. A preferred color space is an HSL color space using, in a three-dimensional coordinate system, hue H, saturation S and lightness L which are the three attributes of colors perceptible by humans. The values of R (red), G (green) and B (blue) signals of the pixels in an original image are converted to HSL values. It is then determined whether these values are included in a designated range of the HSL color space. The HSL values of the pixels within this range are corrected and thereafter converted back to the original RGB signals.

The above method (2) alleviates the difficulty of region selection encountered in the method (1). However, the method (2) requires means (usually a lookup table) for converting the values of RGB signals to HSL values, and an additional lookup table acting as means for converting the HSL values back to the RGB signals. The lookup tables must have a sufficient level of precision to render the two conversions reversible. A memory of large capacity is also required for storing these tables.

Applicant has proposed a color correcting apparatus which eliminates the drawbacks of the above method (2) (Japanese Patent Publication (Unexamined) No. 6-14184).

In this apparatus, HSL values of pixels in an original image are obtained by applying the RGB signals of the pixels to a lookup table, and it is determined whether the HSL values are included in a designated range in HSL space. Then, parameters are applied to the RGB signals of the pixels determined to be within that range, to effect a color correction. Thus, the apparatus realizes a process similar to the method (2) noted above, based on the single lookup table for converting the values of RGB signals to HSL values.

The color correcting apparatus disclosed in Japanese Patent Publication (Unexamined) No. 6-14184, as noted above, provides the advantage of avoiding enlargement of memory capacity to realize a reduction in the cost of the apparatus. Inventor has made intensive research for a possibility of applying this apparatus to contrast correction. It has been found as a result that a new problem remains to be solved in order to effect a proper contrast correction. This problem will be described hereunder.

A lookup table different from the lookup table for converting RGB signals to HSL values is used for contrast correction. FIG. 8 is a schematic illustration of the lookup table for contrast correction, in which the horizontal axis represents input data applied as addresses, and the vertical axis represents output data resulting from a contrast correction. This lookup table is used for each of the R, G and B signals. In FIG. 8, conversion characteristic "a" is used to increase contrast, and conversion characteristic "b" to decrease contrast. The dot-and-dash line represents a neutral characteristic at which the input and output data match.

In the apparatus disclosed in Japanese Patent Publication (Unexamined) No. 6-14184, a pixel of a color to be corrected is designated on an image monitor as the center of correction processing to identify RGB signals of the color to be corrected. An effective range to be processed is determined by using HSL values. When the same technique is applied to contrast correction (e.g. highlighting), RGB signals $C_{IN}$ of the color to be corrected and effective range $R_{IN}$ are designated as shown in FIG. 8. These inputs result in the center of output $C_{OUT}$ and contrast-corrected (i.e. highlighted) range $R_{OUT}$.

In this instance, the color $C_{IN}$ designated for correction and the color (output center) $C_{OUT}$ resulting from the contrast correction have different values ($C_{IN} \neq C_{OUT}$). The operator who carries out a contrast correction in a platemaking process, for example, usually intends to correct contrast among pixels in a selected effective range around the pixel (RGB values) he or she designates as the center of correction processing, without changing the lightness and color tone of that pixel. The above-noted change in the RGB values of the color corrected which is the center of correction processing would be contrary to the operator's intention.

SUMMARY OF THE INVENTION

This invention has been made having regard to the state of the art noted above, and its primary object is to provide a practical contrast correcting apparatus which is capable of correcting contrast among pixels in a selected range without changing the lightness and color tone of a pixel designated as forming the center of correction processing.

The above object is fulfilled, in one aspect of the invention, by designating an effective range of contrast correction with a distance in CIE-Lab perceived color space (first aspect). In another aspect of the invention, the designation is made with values of the three attributes of colors perceived by humans, i.e. hue H, saturation S and lightness L, in place of a distance in CIE-Lab perceived color space (second aspect).

An apparatus for correcting contrast of a particular region selected from an original image, according to the first aspect of the invention, comprises:

original image data storage means for storing RGB signals which are digitized three primary signals of pixels in the original image;

an Lab conversion table for converting the RGB signals to lightness index L and perceived chromaticity indexes a and b of CIE-Lab perceived color space;

processing condition designating means for designating a color to be corrected and to act as a central object of contrast correction processing, for designating an effective range of the contrast correction processing with a distance in the perceived color space and with reference to the color to be corrected, and for designating a characteristic parameter for the contrast correction processing;

a lookup table assigned to each of the RGB signals for contrast correction of the pixels in the original image, for storing RGB output data resulting from a contrast correction, in relation to RGB input data of the RGB signals applied as addresses;

lookup table initializing means for setting the RGB output data corresponding to the RGB input data to the lookup table, such that input and output values match for RGB output data pairing with RGB input data corresponding to the color to be corrected, and that data derived from the characteristic parameter with reference to a matching point between the RGB input data and the RGB output data relating to the color to be corrected are set for RGB output data corresponding to other RGB input data; and output control means for deriving a separating distance in the perceived color space from Lab values of the color to be corrected and Lab values of each of the pixels in the original image successively received from the Lab conversion table, the output control means being operable, when the separating distance is smaller than the distance used in designating the effective range, to determine the pixels to be subjected to the contrast correction processing and validate the RGB output data from the lookup table, and when the separating distance is larger than the distance used in designating the effective range, to determine the pixels to be excluded from the contrast correction processing and output the RGB signals of the original image intact.

The above apparatus has the following functions.

First, the processing condition designating means is operated to designate a color to be corrected and to act as a central object of contrast correction processing, and to designate an effective range of the contrast correction processing with a distance (designated distance) in the perceived color space and with reference to the color to be corrected. After a region to be processed is identified, the designating means is operated to designate a characteristic parameter indicating how contrast should be corrected (e.g. increased or decreased). Based on the designated color to be corrected and the characteristic parameter, the lookup table initializing means initializes the lookup table as follows. For input/output relations of the designated color to be corrected, the same values as RGB input data are set as RGB output data. For other input/output relations, data derived from the characteristic parameter with reference to a matching point between the RGB input and output data relating to the color to be corrected are set as RGB output data. As a result, RGB output data are read from the lookup table for a pixel of the color to be corrected and acting as the center of contrast correction processing, without changing lightness and color tone of the pixel.

After initialization of the lookup table, a contrast correction is carried out for the pixels in the original image as follows. First, RGB signals of the respective pixels are successively read from the original image storage means and transmitted to the Lab conversion table. With this conversion table, the RGB signals of the pixels are converted to lightness index L and perceived chromaticity indexes "a" and "b" of CIE-Lab perceived color space. The Lab values of the pixels are transmitted to the output control means. The output control means computes a separating distance for each pixel in CIE-Lab perceived color space from Lab values of the color to be corrected and Lab values of the pixel. Then, the separating distance of each pixel is compared with the designated distance of the effective range. When the separating distance is smaller than the designated distance, that pixel is determined to be subjected to the contrast correction processing, and the RGB output data from the lookup table is outputted as valid. When the separating distance is larger than the designated distance, the pixel is determined to be excluded from the contrast correction processing, and the RGB signals of the original image are outputted intact.

According to the present invention, as described above, RGB input and output data are set to the same values for the input/output relations of the lookup table relating to the color to be corrected and acting as the center of contrast correction processing. This feature enables the operator to effect a contrast correction as he or she wishes, without changing the lightness and color tone of the pixels having the designated color to be corrected.

Further, since an effective range of contrast correction is designated with a distance in CIE-Lab perceived color space, the operator may relay on his or her senses in designating the effective range, thereby to carry out a contrast correction at will and with facility. In particular, this designating method is advantageous in performing a correction for a gray or near-gray portion of an original image (for which hue cannot be identified).

According to this invention, the RGB signals of the original image are converted to CIE-Lab values in order to determine whether or not pixels are within a range to be processed. The contrast correction is carried out for the RGB signals of the pixels. Thus, the invention requires fewer image data conversion tables than where RGB signals are converted to CIE-Lab values to undergo contrast correction, and thereafter the CIE-Lab values are converted back to RGB signals. This feature allows the apparatus to be simplified accordingly, and reduces the chance of data being lost during conversion.

An apparatus in the second aspect of the invention comprises:

original image data storage means as noted above;

HSL conversion table for converting the RGB signals to values of hue (H), saturation (S) and lightness (L) which are three attributes of perceived color;

processing condition designating means as noted above (except that effective ranges of the contrast correction processing are designated with HSL values);

a lookup table as noted above;

lookup table initializing means as noted above; and output control means for deriving differences, respectively, between HSL values of the color to be corrected and HSL values of the pixels in the original image successively received from the HSL conversion table, the output control means being operable, when the differences are smaller than the effective ranges, respectively, to determine the pixels to be subjected to the contrast correction processing and validate the RGB output data from the lookup table, and when any one of the differences is larger than a corresponding one the effective ranges, to determine the pixels to be excluded from the contrast correction processing and output the RGB signals of the original image intact.

The apparatus in the second aspect of the invention has basically the same functions as the apparatus in the first aspect which designates an effective range of contrast correction with a distance in CIE-Lab perceived color space. In the apparatus in the second aspect of the invention, an effective range of contrast correction is designated with HSL values which are the three attributes of perceived color. Therefore, in order to determine whether or not pixels in the original image are to be subjected to contrast correction, RGB signals of each pixel are converted to HSL values. The output control means computes differences, respectively, between HSL values of the color to be corrected and HSL values of the pixels in the original image, and compares the differences with effective ranges corresponding thereto. When the differences are smaller than the effective ranges, respectively, the output control means determines the pixels to be subjected to the contrast correction processing and validate the RGB output data from the lookup table. When any one of the differences is larger than a corresponding one of the effective ranges, the output control means determines the pixels to be excluded from the contrast correction processing and outputs the RGB signals of the original image intact.

According to the apparatus in the second aspect of the invention, as in the first aspect of the invention, a contrast correction may be carried out at will and with facility without changing the lightness and color tone of pixels having the designated color to be corrected. The apparatus may have a simplified construction, and a loss of data may be avoided. In particular, in the second aspect of the invention, an effective range is designated with the three attributes (hue, saturation and lightness) of perceived color, which enables a region of pronounced color in an original image to be designated with nicety as an effective range of contrast correction.

The apparatus in the first and second aspects of the invention, preferably, comprise display means for displaying the original image upon receipt of the RGB signals of the original image from the original image data storage means. The processing condition designating means may designate the color to be corrected, with pixels in the original image displayed on the display means, and extract the RGB signals of the color to be corrected from the original image data storage means based on addresses of the pixels used in designating the color to be corrected. In this case, preferably, the processing condition designating means extracts the RGB signals of the pixels used in designating the color to be corrected and of adjacent pixels from the original image data storage means based on the addresses of the pixels used in designating the color to be corrected, and adopts averages of the RGB signals as RGB signals of the color to be corrected. The color to be corrected may be designated with numerical values of the RGB signals, rather than a pixel in the original image. Preferably, the designated color to be corrected is displayed in superposition in a predetermined region of a screen displaying the original image.

The processing condition designating means may designate, for example, a gradient of an input/output conversion characteristic expressed by a linear expression of the lookup table, as the characteristic parameter for the contrast correction processing. In this case, the lookup table initializing means may obtain an input/output conversion characteristic equation expressed by a linear expression having the gradient designated by the processing condition designating means and extending through the matching point between the RGB input data and the RGB output data relating to the color to be corrected, to obtain output data by successively substituting input data into the input/output conversion characteristic equation, and to set the output data in relation to the input data. Consequently, a contrast correction may be carried out for a desired region without changing the lightness and color tone of the designated color.

In the first aspect of the invention, preferably, the output control means includes a mixing processor for mixing the RGB signals of the pixels successively received from the original image storage means and the RGB signals of the pixels successively received from the lookup table, at mixing ratios for the pixels, respectively, and a mixing ratio computing unit for computing the mixing ratios;

the mixing ratio computing unit being operable to derive the separating distance in the perceived color space from Lab values of the color to be corrected and Lab values of the pixels in the original image successively received from the Lab conversion table, such that, when the separating distance is smaller than the distance used in designating the effective range, the pixels are determined to be subjected to the contrast correction processing, the mixing ratios being amended to diminish mixing quantities of the RGB output data from the lookup table with an increase in the separating distance, and when the separating distance is larger than the distance used in designating the effective range, the pixels are determined to be excluded from the contrast correction processing and the RGB output signals of the lookup table are set to zero.

With this construction, when the separating distances of certain pixels are smaller than the designated distance (that is, when those pixels are determined to be subjected to contrast correction), the mixing ratio computing unit amends the mixing ratios such that RGB output data of the lookup table are mixed in decreasing ratios with an increase in the separating distance. Then, the mixing processor reduces the ratio of RGB output data subjected to the contrast correction with respect to RGB signals of the original image, as the pixels within the effective range of contrast correction lie closer to the boundary of the effective range. As a result, a tone jump at the boundary of the effective range is suppressed.

Preferably, the mixing ratio computing unit executes selectively plural types of mixing ratio amendment processing having different modes of change in the mixing ratios depending on the separating distance in the perceived color space between Lab values of the color to be corrected and Lab values of the pixels in the original image, the mixing ratio computing unit including amendment selecting means for selecting one of the plural types of mixing ratio amendment processing. Since, with this construction, a desired one of the plural types of mixing ratio amendment processing is selected, the degree of gradually suppressing the contrast correction from a central pixel to peripheral pixels in the effective range may be determined in accordance with the original image. This provides the effect of suppressing a tone jump with greater assurance.

Similarly, in order to suppress a tone jump at the boundary of the effective range, the output control means in the second aspect of the invention preferably includes a mixing processor for mixing the RGB signals of the pixels successively received from the original image storage means and the RGB signals of the pixels successively received from the lookup table, at mixing ratios for the pixels, respectively, and a mixing ratio computing unit for computing the mixing ratios;

the mixing ratio computing unit being operable to derive the differences from HSL values of the color to be corrected and HSL values of the pixels in the original image successively received from the HSL conversion table, such that, when the differences are smaller than the effective ranges, respectively, the pixels are determined to be subjected to the contrast correction processing, the mixing ratios being amended to diminish mixing quantities of the RGB output data from the lookup table with an increase in each of the differences, and when any one of the differences is larger than a corresponding one of the effective ranges, the pixels are determined to be excluded from the contrast correction processing and the RGB output signals of the lookup table are set to zero.

It is preferred still that the mixing ratio computing unit executes selectively plural types of mixing ratio amendment processing having different modes of change in the mixing ratios depending on the differences between HSL values of the color to be corrected and HSL values of the pixels in the original image, respectively, the mixing ratio computing unit including amendment selecting means for selecting one of the plural types of mixing ratio amendment processing.

BRIEF DESCRIPTION OF THE DRAWINGS

For the purpose of illustrating the invention, there are shown in the drawings several forms which are presently preferred, it being understood, however, that the invention is not limited to the precise arrangements and instrumentalities shown.

FIG. 4 is an explanatory view showing preparation of a lookup table for use in contrast correction;

FIG. 5 is a schematic view of the lookup table for contrast correction shown in respect of each of red, green and blue;

DETAILED DESCRIPTION OF THE PREFERRED EMBODIMENTS

Preferred embodiments of the present invention will be described in detail hereinafter with reference to the drawings.

[FIRST EMBODIMENT]

Figure 1:
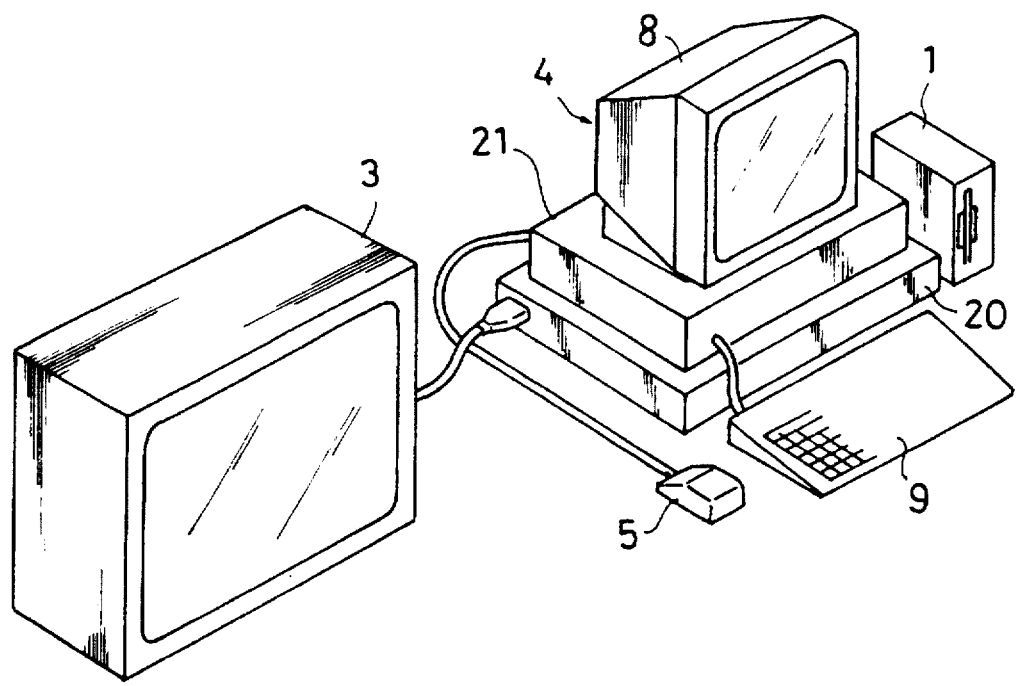
FIG. 1 is a perspective view showing an outward appearance of a contrast correcting apparatus according to this invention.

FIG. 1 is a perspective view showing an outward appearance of a contrast correcting apparatus in a first embodiment of this invention.

The apparatus includes, as main components thereof, an image monitor 3 for displaying an image to be subjected to a contrast correction and an image resulting from the contrast correction, a data input device 4, a drive unit (i.e. a magneto-optical disk driver) 1 for driving a magneto-optical disk storing image data, and a frame memory unit 20 having frame memories for storing image data before and after a correction, respectively.

The data input device 4 includes a control monitor 8, a keyboard 9 and a mouse 5 for the operator of this apparatus to input data, and a computer 21 whose main function is contrast correction processing.

Figure 2:
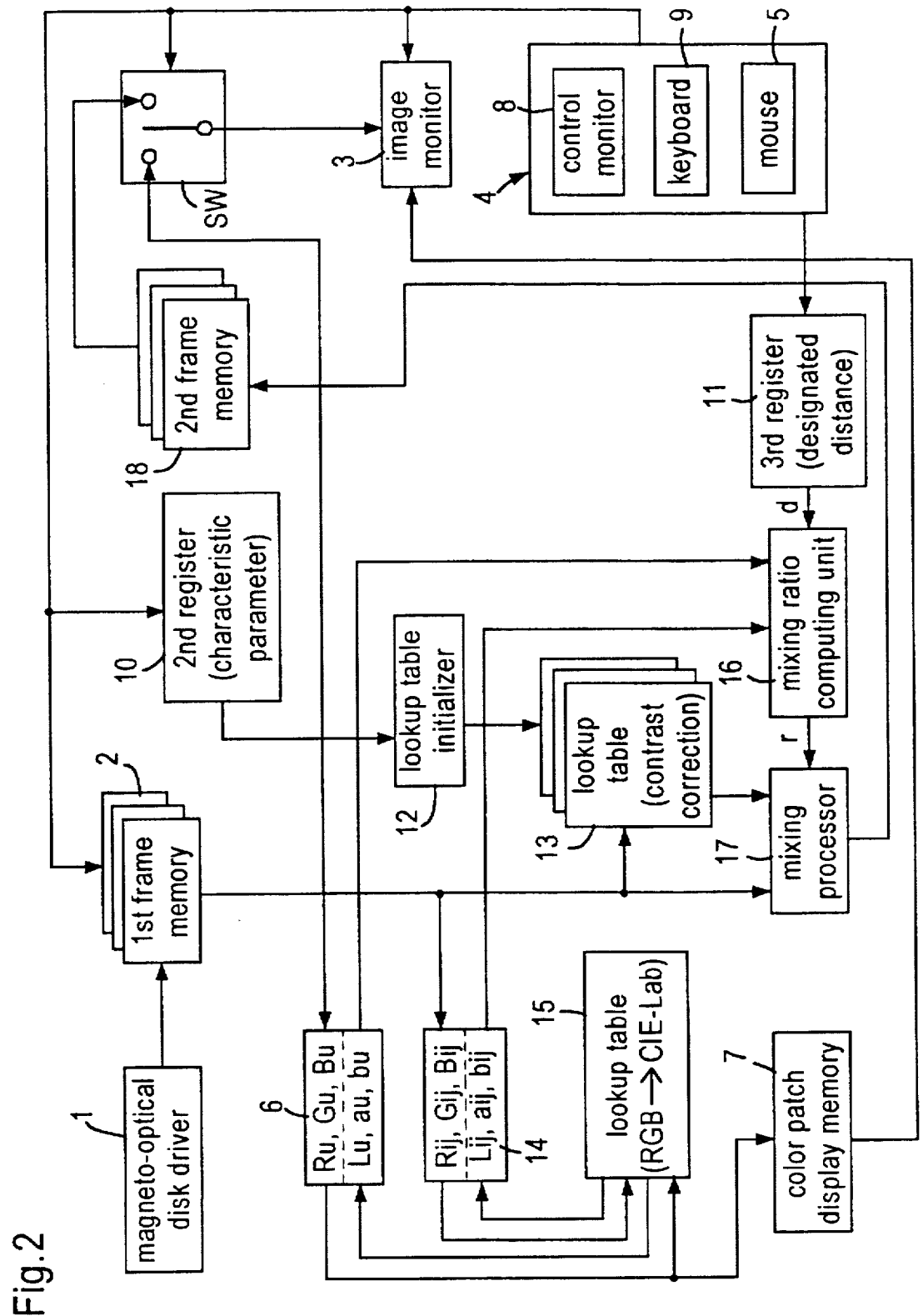
FIG. 2 is a system block diagram showing an outline of a first embodiment of the invention.

FIG. 2 is a block diagram of a system of this apparatus. The construction and operation of this apparatus will be described with reference to this block diagram, and in combination with controls made by the operator.

It is to be noted that FIG. 2 shows the part of functions of the computer 21 relating to contrast correction processing (e.g. initialization of a lookup table described hereinafter, mixing ratio computation, and mixing) independently in the block diagram. The functions to carry out other types of processing, such as processing to output and display data on the control monitor 8 are assigned to the data input device 4.

The magneto-optical disk driver 1 acts to take digitized image signals of an image to be processed (i.e. an original image) into this apparatus. Although it is assumed that original image signals are stored on a magneto-optical disk, these signals may be stored on a magnetic tape or a hard disk. In the latter case, the magneto-optical disk driver 1 is replaced with a drive unit for accessing the alternative storage medium. Further, original image signals may be inputted to this apparatus through an image input device such as a scanner.

The frame memory unit 20 contains a first frame memory 2 having a capacity to store, in each frame, original image signals, i.e. three primary color signals of R (red), G (green) and B (blue) of one original image read through the magnet-optical disk driver 1. The first frame memory 2 corresponds to the original image data storage means of this invention.

The original image signals in the first frame memory 2 are outputted through an internal switch SW to the image monitor 3 to display the image thereon. The operator controls a pointing device such as the mouse 5 of the data input device 4 while looking at the screen of the image monitor 3, to select a position of a reference color (i.e. color to be corrected) for which the operator desires to correct contrast. Then, the data input device 4 outputs coordinate data of the point designated on the screen of the image monitor 3 as an address for reading by the first frame memory 2. The data input device 4 corresponds to the processing condition designating means of this invention.

It is assumed here that the three primary color signals read of the color to be corrected are Ru, Gu and Bu signals.

Although the Ru, Gu and Bu signals are the RGB signals of the point (reference pixel) designated with the mouse 5, the color of the point designated by the operator, i.e. the color to be corrected as seen in the eyes of the operator, strictly speaking, does not consist in the color of the reference pixel alone but is influenced by the colors of pixels surrounding the reference pixel. Thus, the Ru, Gu and Bu signals may be based on average values of RGB signals of a plurality of pixels, e.g. four or eight pixels, around the reference pixel designated with the mouse 5.

The Ru, Gu and Bu signals of the color to be corrected are stored in a first register 6. The Ru, Gu and Bu signals are transmitted to an RGB to CIE-Lab conversion lookup table 15 to be converted to CIE-Lab values. The values Lu, au and bu resulting from the conversion are stored in a different region of the first register 6. The lookup table 15 and a CIE-Lab perceived color space expressing the CIE-Lab values will be described in detail hereinafter. The first register 6 and various other registers described hereinafter are present, for example, as part of a storage region in an internal memory (main memory) of computer 21. Various computing units described hereinafter correspond to a CPU (central processing unit) for executing a program based on a processing algorithm.

A color patch display memory 7 stores the Ru, Gu and Bu signals at addresses corresponding to a predetermined region (e.g. a region in a lower left corner) on the screen of the image monitor 3. These signals are outputted to the image monitor 3 to display a color patch of the color to be corrected, as superposed on the original image. The color patch refers to a predetermined region on the image monitor 3 filled with a color designated for correction, to enable the operator to observe the designated color independently of the original image. To enable confirmation by the operator, the Ru, Gu and Bu signals may be converted to numerical values for display on the control monitor 8 of the data input device 4.

Next, the operator designates, through the keyboard 9 of the data input device 4, a characteristic parameter indicating how contrast should be corrected. This characteristic parameter indicates, for example, a gradient of input and output conversion characteristics in a contrast correction lookup table 13 described hereinafter. In this embodiment, where a neutral gradient of conversion characteristic at which input and out values match is regarded as "1", a gradient of maximum contrast is "2" and a gradient of minimum contrast is "½". Gradients of conversion characteristics within this range are designated with numerical values +100 to −100 ("0" being neutral). The characteristic parameter designated is stored in a second register 10.

After designating the color to be corrected and characteristic parameter, the operator designates an effective range of contrast correction. In this apparatus, an effective range is determined by a distance (designated distance) in CIE-Lab perceived color space with reference to the color to be corrected. CIE-Lab perceived color space is a type of uniform perceived color space stipulated by CIE (or Commission Internationale de l'Eclairage), which has lightness index L and perceived chromaticity indexes "a" and "b" as coordinate axes.

Figure 3:
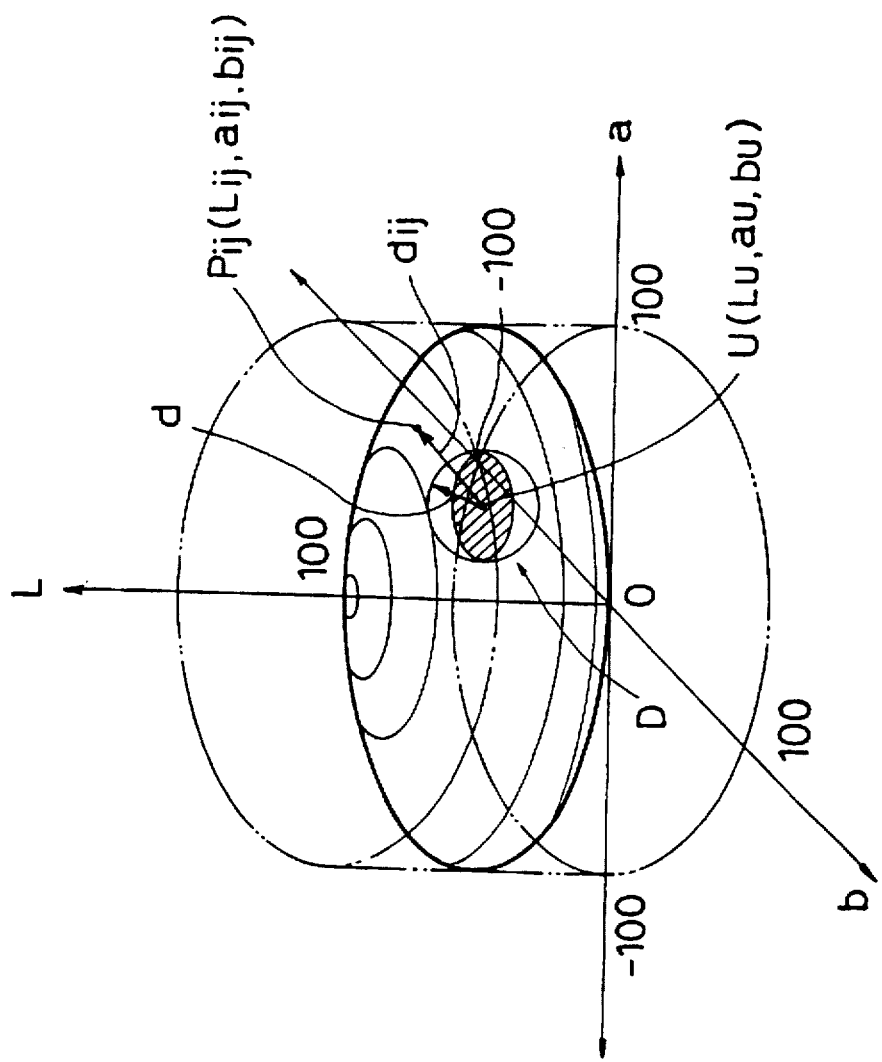
FIG. 3 is a schematic view of CIE-Lab perceived color space.

FIG. 3 schematically shows CIE-Lab perceived color space. CIE-Lab perceived color space has a flat spherical shape inscribing a cylinder shown in dot-and-dash lines in FIG. 3. In this embodiment, distance "d" in CIE-Lab perceived color space is designated with a numerical value where this color space is obtained by expressing lightness index L by a numerical value from 0 to 100 and each of perceived chromaticity indexes "a" and "b" by a numerical value from −100 to 100. That is, if the color to be corrected in CIE-Lab perceived color space is located at point U in FIG. 3, it means that pixels in the original image having perceived colors belonging to an internal region in a small sphere D of radius "d" around point U are selected for contrast correction.

It is difficult to designate a color by intuition when an effective range of contrast correction is designated with RGB values. This is because the RGB color mixing system requires the operator to be conscious of additive mixing when working with color. Where, as in this embodiment, an effective range of correction is designated with a distance in CIE-Lab perceived color space, the designating operation may be carried out easily and accurately in accord with the operator's senses. In particular, according to the designating method in this embodiment, a degree of hue need not be determined in designating an effective range. This feature is advantageous in designating, as an effective range, a gray or near-gray region of an original image for which a definition of hue is difficult. Even when designating a colored region of an original image as an effective range of contrast correction, a relatively small designated distance will entail no practical problem.

Designated distance "d" indicating an effective range of contrast correction, as described above, is stored in a third register 11.

This apparatus determines whether the color components of pixels in the original image stored in the first frame memory 2 are in the effective range of contrast correction or not. This determination is based on the conditions for contrast correction thus far designated, i.e. "the RGB signals of the color to be corrected (Ru, Gu and Bu signals)", "characteristic parameter" and "designated distance "d" of the effective range in CIE-Lab perceived color space".

Prior to execution of contrast correction processing, a lookup table initializer 12 sets input/output conversion characteristics provided for each of R, G and B for contrast correcting purposes to the lookup table 13 (i.e. initialization) based on the designated "Ru, Gu and Bu signals of the color to be corrected" and "characteristic parameter". A method of this initialization will be described hereinafter with reference to FIG. 4.

FIG. 4 is a schematic view of the contrast correction lookup table 13. The horizontal axis represents, for example, 8-bit input data (from 0 to 255) applied as addresses, while the vertical axis represents 8-bit output data (from 0 to 255) resulting from a contrast correction. FIG. 4 also shows, in a dot-and-dash line and for reference, a neutral characteristic at which the input and output data match.

For initializing the lookup table 13, the lookup table initializer 12 determines a characteristic converting expression (which is a linear expression in this embodiment) which has a gradient corresponding to the characteristic parameter designated, and which extends through point U at which the input and output data match. The input data "from 0 to 255" are successively substituted into this characteristic converting expression to obtain output data. The output data are established as corresponding to the input data. Output data "0" is set for an output region corresponding to an input data for which a value below "0" is derived from the characteristic converting expression. Output data "255" is set for an output region having a result of calculation exceeding "255". Thus, the same value as the input data is set to the output data relating to the color to be corrected. Even when the lookup table 13 is given the RGB signals of pixels in an original image having the same value as the color to be corrected, RGB output data having the same value as RGB input data are obtained without changing lightness and color tone.

The RGB signals of the color to be corrected (i.e. Ru, Gu and Bu signals) have different values. Consequently, the lookup table 13 has different input/output relations (conversion characteristics) for R, G and B as shown in FIG. 5. However, the conversion characteristic gradient of lookup table 13 is the same, and points $U_R$, $U_G$ and $U_B$ corresponding to the RGB signals are all on the neutral characteristic line.

After initialization of the lookup table 13, the apparatus executes a contrast correction of pixels in the original image in the following sequence.

First, the RGB signals of pixels in the original image are successively read from the first frame memory 2 and stored once in a fourth register 14. Assume that the first frame memory 2 has the number of pixels "x" in the horizontal direction, and the number of pixels "y" in the vertical direction. Then, signals Rij, Gij and Bij of pixels Pij (i=1, 2, ... and x; j=1, 2 ... and y) are successively stored in the fourth register 14. Signals Rij, Gij and Bij stored in the fourth register 14 are applied to the lookup table 13 and a mixing processor 17 described hereinafter, and to the RGB to CIE-Lab conversion lookup table 15 to be converted to CIE-Lab values (Lij, aij and bij).

The RGB to CIE-Lab conversion lookup table 15 has a function to enable conversion of the values of Rij, Gij and Bij signals to lightness index L and perceived chromaticity indexes "a" and "b" defined by CIE-Lab perceived color space in order to determine whether or not the color components of pixels in the original image are included in the effective range of contrast correction (small sphere D in FIG. 3) designated in CIE-Lab perceived color space. This lookup table 15 is prepared in the following sequence in advance.

For converting the values of R, G and B for CIE-Lab color space, tristimulus values Ximax, Yimax and Zimax (i=R, G, B) when maximum values Rmax, Gmax and Bmax of R, G and B are applied to the image monitor 3 are first measured with a spectral radiometer.

Next, the gamma of the image monitor 3 (a constant showing a relationship between input signal and luminous output of a color monitor: hereinafter expressed by sign "t" for expediency) is used to derive, from the following equations (1) to (3), tristimulus values X, Y and Z when given values r, g and b of RGB are inputted:

$$X = \Sigma (j/\text{imax})^t \cdot X\text{imax} \quad (1)$$

$$Y = \Sigma (j/\text{imax})^t \cdot Y\text{imax} \quad (2)$$

$$Z = \Sigma (j/\text{imax})^t \cdot Z\text{imax} \quad (3)$$

In the above equations, i=R, G or B, and j=r, g or b. As i changes from R to G and to B, so does j from r to g and to b.

The tristimulus values X, Y and Z are used to convert the values of R, G and B to values in CIE-Lab color space, as by the following equations (4) to (6).

$$L = 116 \cdot (Y/Yn)^{1/3} - 16 \quad (4)$$

$$a = 500 \cdot [(X/Xn)^{1/3} - (Y/Yn)^{1/3}] \quad (5)$$

$$b = 200 \cdot [(Y/Yn)^{1/3} - (Z/Zn)^{1/3}] \quad (6)$$

where $Yn = \Sigma Y\text{imax}$ (i=R, G, B), $Xn = \Sigma X\text{imax}$ (i=R, G, B), and $Zn = \Sigma Z\text{imax}$ (i=R, G, B).

The data of CIE-Lab values obtained as described above are stored in the lookup table 15 shown in FIG. 2, so as to correspond to the RGB input data. The values of CIE-Lab corresponding to the number of bits (n-bits) of digitized RGB signals would make an enormous amount of data. Thus, for example, several lower bits may be deleted from the n-bits to make m-bits (n>m), and the values of CIE-Lab (which are in n-bits since data need not be deleted therefrom) corresponding to the RGB signals in m-bits may be set to the lookup table 15.

As noted hereinbefore, the values of RGB signals are converted to the values of CIE-Lab perceived color space in order to determine whether the color components of pixels in the original image are within the designated effective range of contrast correction or not. Since the CIE-Lab values obtained by the conversion are not used in the contrast correction processing, no problem of low precision arises from the reduction in the number of bits of the RGB signals.

Thus, in converting the Rij, Gij and Bij signals of pixels in the original image stored in the fourth register 14 to CIE-Lab values (Lij, aij and bij), only the m-bits left after deleting the several lower bits from the Rij, Gij and Bij signals (in n-bits) are outputted to the lookup table 15 to obtain the CIE-Lab values in n-bits. The Lij, aij and bij values are stored in a different storage region of the fourth register 14. The Rij, Gij and Bij signals applied to the lookup table 13 and mixing processor 17 are n-bit signals with no lower bits deleted therefrom.

For the same reason, in converting the Ru, Gu and Bu signals of the color to be corrected to CIE-Lab values (Lu, au and bu) described hereinbefore, only the m-bits left after deleting the several lower bits from the Ru, Gu and Bu signals (in n-bits) are outputted to the lookup table 15 to obtain the CIE-Lab values in n-bits. The Lu, au and bu values are stored in a different storage region of the first register 6.

The Lu, au and bu values of the color to be corrected stored in the first register 6 and the Lij, aij and bij values of pixels in the original image stored in the fourth register 14 are applied to a mixing ratio computing unit 16. The mixing ratio computing unit 16 finds separating distances dij (distances in the CIE-Lab perceived color space) between the Lu, au and bu values of the color to be corrected and the Lij, aij and bij values of pixels in the original image, and compares the separating distances dij with the designated distance "d" of the effective range to determine whether the pixels are within the effective range of contrast correction. Based on the results of the above determination, the mixing ratio computing unit 16 computes mixing ratios "r" of RGB data to be outputted from the lookup table 13 for the Rij, Gij and Bij signals of pixels Pij in the original image. The mixing ratio computing unit 16 and the mixing processor 17 described hereinafter correspond to the output control means of this invention.

The separating distances dij between the Lu, au and bu values of the color to be corrected and the Lij, aij and bij values of pixels in the original image are derived from the following equation (7):

$$dij = \sqrt{[(Lu - Lij)^2 + (au - aij)^2 + (bu - bij)^2]} \quad (7)$$

FIG. 3 schematically shows a separating distance dij in CIE-Lab perceived color space between the Lu, au and bu values of the color to be corrected and the Lij, aij and bij values of a pixel in the original image successively stored in the fourth register 14. The mixing ratio computing unit 16 compares separating distance dij of each pixel Pij in the original image derived from the above equation, with the designated distance "d" of the effective range stored in the third register 11. When separating distance dij is larger than distance "d", the mixing ratio computing unit 16 determines that the pixel Pij is outside the range of contrast correction, and sets mixing ratio "r" to zero. When separating distance dij is equal to or smaller than distance "d", the mixing ratio computing unit 16 determines that the pixel Pij is to be subjected to contrast correction, and derives mixing ratio "r" from the following equation (8):

$$r = 1 - dij/d \quad (8)$$

As is clear from the relationship between separating distance dij and mixing ratio "r" determined as described above, mixing ratio "r" is given maximum value "1" when pixel Pij has the same value as the color to be corrected. Mixing ratio "r" progressively diminishes for pixels lying away from the color to be corrected (reference pixel). Mixing ratio "r" for pixels on the boundary of the effective range and those outside the effective range is given minimum value "0". This means, as will be understood from the operation of the mixing processor 17 described hereinafter, that the effect of contrast correction lessens for pixels at increasing distances from the color to be corrected.

Mixing ratios "r" for pixels Pij in the original image computed by the mixing ratio computing unit 16 are applied to the mixing processor 17. The mixing processor 17 mixes, and outputs (as $m_{out}$), RGB output data (hereinafter referenced $L_{out}$) of pixels Pij received from the lookup table 13, and RGB values (hereinafter referenced raw) of pixels Pij in the original image, using the following equation based on mixing ratios "r":

$$m_{out} = r \cdot L_{out} + (1-r) \cdot raw \qquad (9)$$

Consequently, RGB output data of lookup table 13 are outputted as they are for pixels Pij having the same color as the color to be corrected (r=1). For pixels Pij within the effective range but remote from the color to be corrected in CIE-Lab perceived color space (1>r>0), RGB output data of lookup table 13 are mixed in decreasing ratios as pixels Pij lie closer to the boundary of the effective range. For pixels Pij outside the effective range, the RGB values of the original image are outputted as they are. A tone jump caused by an abrupt change in contrast at the boundary of the effective range is suppressed by diminishing the effect of contrast correction toward the boundary of the effective range.

RGB blend output for each pixel Pij provided by the mixing processor 17 is stored in a second frame memory 18 with frames assigned to R, G and B, respectively (which is mounted in the frame memory unit 20 in FIG. 1). The operator may confirm an image resulting from the contrast correction on the image monitor 3, as necessary, by operating the internal switch SW.

[SECOND EMBODIMENT]

In the apparatus in the first embodiment, an effective range of contrast correction is designated with a distance in CIE-Lab perceived color space. In the apparatus in the second embodiment, an effective range is designated with three values (dH, dS and dL) of hue H, saturation S and lightness L, which are the three attributes of colors perceptible by humans.

Figure 6:
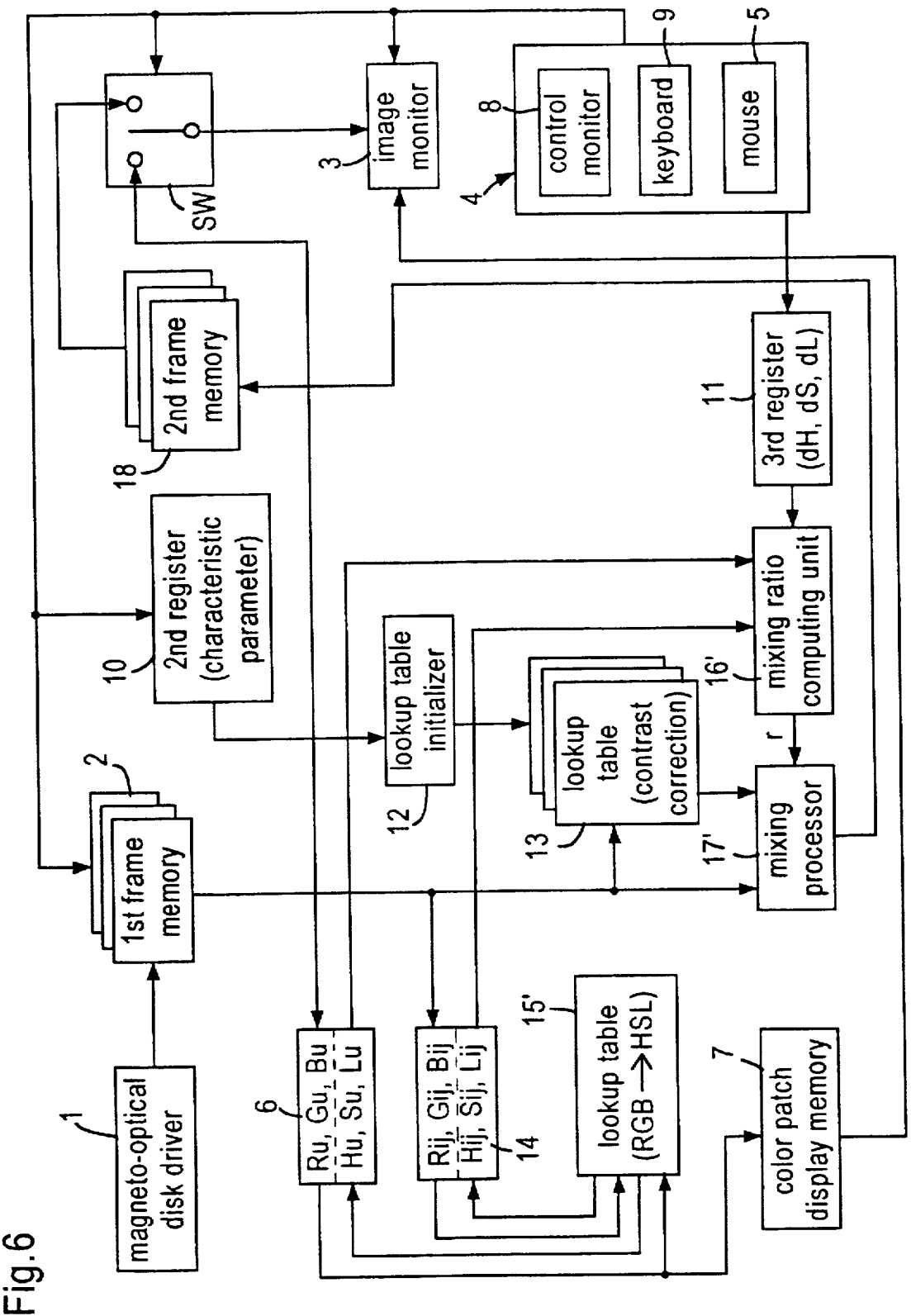
FIG. 6 is a system block diagram showing an outline of a second embodiment of the invention.
Figure 8:
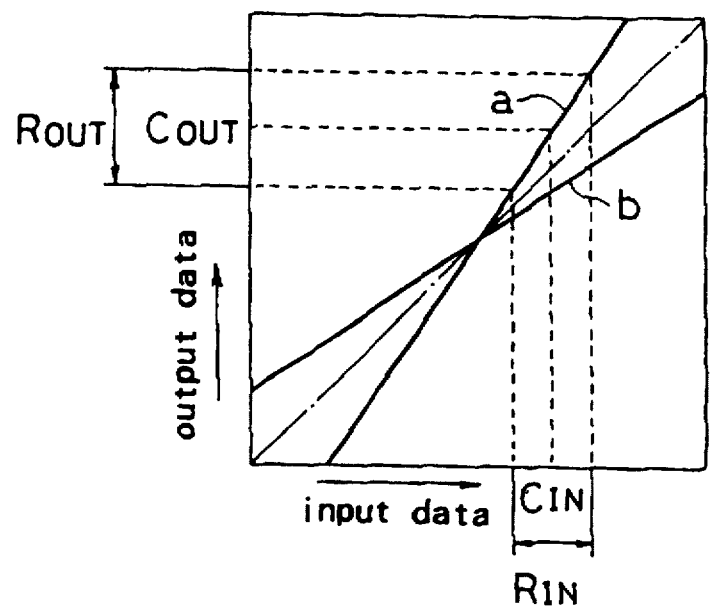
FIG. 8 is an explanatory view of a conventional contrast correcting process.

FIG. 6 is a block diagram of a system of this apparatus. The basic construction is the same as in the first embodiment. However, it is necessary to convert RGB signals of pixels in an original image to HSL values, which are the three attributes of perceived color, in order to determine whether or not the pixels in the original image are within the effective range. For this purpose, the apparatus includes an RGB to HSL conversion lookup table 15'.

Figure 7:
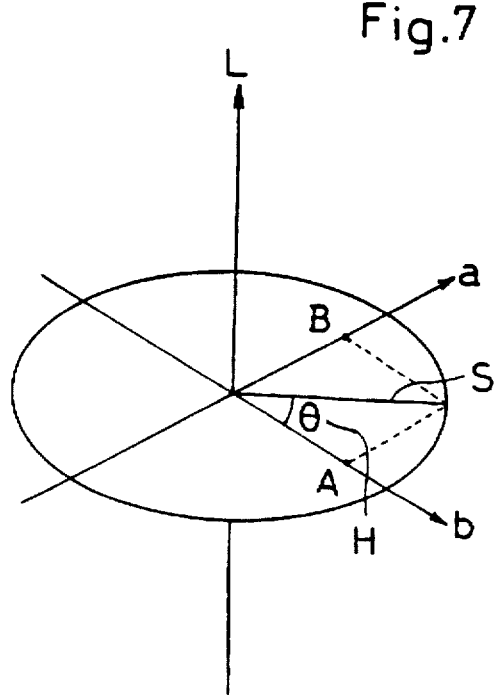
FIG. 7 is a view showing a relationship between HSL color space and CIE-Lab color space.

The HSL values of pixels in the original image are obtained by converting RGB values of the pixels in the original image to CIE-Lab values as described in the first embodiment, and thereafter converting the CIE-Lab values to HSL values. FIG. 7 shows a relationship between CIE-Lab color space and HSL color space. In FIG. 7, the L-axis of CIE-Lab color space corresponds directly to lightness L of HSL color space, a radius vector on two-dimensional coordinates of the a-axis and b-axis corresponds to saturation S, and an angle θ between the b-axis and radius vector corresponds to hue H. Thus, the L value derived from equation (4) above is regarded as the value of lightness in HSL color space, while saturation S and hue H are derived from the following equations:

$$S^2 = A^2 + B^2 \qquad (10)$$

$$H = \tan^{-1}(B/A) \qquad (11)$$

However, when A<0, 180 degrees are added to a result of computation for hue H, and when A>0 and B<0, 360 degrees are added thereto. This is done in order to avoid results of computation showing negative values.

The values of H, S and L derived from the above operational expressions and corresponding to the values of R, G and B are stored in the lookup table 15' shown in FIG. 6. To avoid a large amount of data, as described in the first embodiment, several lower bits are deleted from the RGB values in n-bits to make m-bits (n>m), and the HSL values in n-bits corresponding to the RGB signals are stored.

The effective range data dH, dS and dL for contrast correction designated through the data input device 4 are stored in the third register 11. The Hu, Su and Lu values converted by the lookup table 15' of the color to be corrected are stored in the first register 6. The Hij, Sij and Lij values of pixels in the original image are stored in the fourth register 14.

A mixing ratio computing unit 16' finds differences between the Hu, Su and Lu values of the color to be corrected and the Hij, Sij and Lij values of pixels in the original image, and compares the differences with the effective range data dH, dS and dL to determine whether the pixels are within the effective range of contrast correction. This operation uses the following expressions:

$$dH < |Hij - Hu|,$$

$$dS < |Sij - Su|, \text{ and}$$

$$dL < |Lij - Lu|.$$

When all of the values of Hij, Sij and Lij satisfy the above expressions, the pixel is regarded as being within the effective range (i.e. to be subjected to contrast correction). When even one of the expressions is not satisfied, the pixel is excluded from the contrast correction.

When the pixel is determined to be excluded from the contrast correction, zero is set to mixing ratio "r" of RGB output data of lookup table 13 with respect to Rij, Gij and Bij signals of that pixel. When the pixel is determined to be subjected to contrast correction, mixing ratio "r" is derived from the following equation (12):

$$r = (1 - |Hij - Hu|/dH) \cdot (1 - |Sij - Su|/dS) \cdot (1 - |Lij - Lu|/dL) \qquad (12)$$

As in the first embodiment, mixing ratio "r" determined as described above progressively diminishes from maximum value "1", for pixels Pij lying away from the color to be corrected. Mixing ratio "r" for pixels on the boundary of the effective range and those outside the effective range is given minimum value "0". This means that the effect of contrast correction lessens for pixels at increasing distances from the color to be corrected.

Mixing ratios "r" computed as above are applied to the mixing processor 17. As in the first embodiment, the mixing processor 17 mixes, based on mixing ratios "r", and outputs, RGB output data of pixels Pij received from the lookup table 13 and RGB values of pixels Pij in the original image. Consequently, RGB output data of lookup table 13 are outputted as they are for pixels Pij having the same color as the color to be corrected. For pixels Pij within the effective range but remote from the color to be corrected in HSL color space, the effect of contrast correction is diminished toward the boundary of the effective range, thereby suppressing a tone jump caused by an abrupt change in contrast at the boundary of the effective range.

In this embodiment, as described above, an effective range of contrast correction is designated with HSL values. As in the first embodiment, the designating operation may be carried out in accord with the operator's senses. In particular, according to the designating method in this embodiment, an effective range may be designated with the three attributes (HSL values) of perceived color, which enables a region of pronounced color (e.g. a blue or red region) in an original image to be designated with nicety as an effective range.

This invention is not limited to the embodiments described hereinbefore, but may be modified in various ways, as follows:

(1) A color to be corrected may be designated by inputting numerical values of R, G and B. In this case, a color patch of the color to be corrected may advantageously be displayed on the image monitor 3 to enable confirmation of the color selected by inputting the numerical values.

(2) The method of designating an effective range of contrast correction may be modified as follows:

(a) Effective ranges of contrast correction are classified beforehand into three categories, "large", "medium" and small", corresponding to designated distances (or HSL values) in CIE-Lab perceived color space (e.g. "large" to distance 80, "medium" to distance 50, and "small" to distance 20), so that the operator may select one of these categories. In the absence of an effective range designated, the "medium" range may be selected automatically.

(b) An effective range is designated with pixels in an original image displayed on the image monitor 3, for example, (i) by designating one or more pixels to be contrast-corrected adjacent the boundary of the effective range, (ii) by designating one or more pixels not to be contrast-corrected adjacent the boundary of the effective range, or (iii) by designating one or more pixels to be contrast-corrected and one or more pixels not to be contrast-corrected adjacent the boundary of the effective range.

(3) To determine mixing ratio "r" in the first embodiment, separating distance dij between a reference pixel (Lu, au, bu) of a color to be corrected in CIE-Lab perceived color space and each pixel Pij (Lij, aij, bij) in the original image may be derived from the following equation (13):

$$dij' = |Lu - Lij| + |au - aij| + |bu - bij| \quad (13)$$

This equation is simpler than equation (7) for computing distance dij described in the first embodiment, and reduces the load of computation processing.

A similar method is applicable to the second embodiment also. For example, a choice may be made between correction of mixing ratio "r" based on equation (12) set out hereinbefore and correction of mixing ratio "r'" based on the following equation (14):

$$r' = \sqrt{[(1 - |Hij - Hu|/dH)} \cdot \sqrt{(1 - |Sij - Su|/dS)} \cdot \sqrt{(1 - |Lij - Lu|/dL)} \quad (14)$$

(4) In the foregoing embodiments, a contrast correction is carried out for the pixels within a designated effective range. All pixels in the original image are candidates for contrast correction. That is, all of the pixels in an effective range selected from one image are subjected to contrast correction. If this is inconvenient, a broad region for contrast correction may be designated with the mouse 5 or the like of the data input device 4, and a contrast correction may be carried out for the pixels in that region and within an effective range as well.

The present invention may be embodied in other specific forms without departing from the spirit or essential attributes thereof and, accordingly, reference should be made to the appended claims, rather than to the foregoing specification, as indicating the scope of the invention.

What is claimed is:

1. An apparatus for correcting contrast of a particular region selected from an original image, comprising:

original image data storage means for storing RGB signals which are digitized three primary signals of pixels in said original image;

a Lab conversion table for converting said RGB signals to lightness index L and perceived chromaticity indexes a and b of CIE-Lab perceived color space;

processing condition designating means for designating a color to be corrected and to act as a central object of contrast correction processing, for designating an effective range of the contrast correction processing with a distance in said perceived color space and with reference to said color to be corrected, and for designating a characteristic parameter for the contrast correction processing;

a lookup table assigned to each of said RGB signals for contrast correction of said pixels in said original image, for storing RGB output data resulting from a contrast correction, in relation to RGB input data of said RGB signals applied as addresses;

lookup table initializing means for setting said RGB output data corresponding to said RGB input data to said lookup table, such that input and output values match for RGB output data pairing with RGB input data corresponding to said color to be corrected, and that data derived from said characteristic parameter with reference to a matching point between said RGB input data and said RGB output data relating to said color to be corrected are set for RGB output data corresponding to other RGB input data; and output control means for deriving a separating distance in said perceived color space from Lab values of said color to be corrected and Lab values of each said pixels in said original image successively received from said Lab conversion table, said output control means being operable, when said separation distance is smaller than said distance used in designating said effective range, to determine said pixels to be subjected to said contrast correction processing and validate said RGB output data from said lookup table; and when said separating distance is larger than said distance used in designating said effective range, to determine said pixels to be excluded from said contrast correction processing and output said RGB signals of said original image intact, wherein said processing condition designating means is operable to designate a gradient of an input/output conversion characteristic expressed by a linear expression of said lookup table, as said characteristic parameter for the contrast correction processing.

2. An apparatus as defined in claim 1, wherein said processing condition designating means is operable to designate said color to be corrected with numerical values of said RGB signals.

3. An apparatus as defined in claim 1, wherein said lookup table initializing means is operable to obtain an input/output conversion characteristic equation expressed by a linear expression having said gradient designated by said processing condition designating means and extending through said matching point between said RGB input data and said RGB output data relating to said color to be corrected, to obtain output data by successively substituting input data into said input/output conversion characteristic equation, and to set said output data in relation to said input data.

4. An apparatus as defined in claim 1, wherein said output control means includes a mixing processor for mixing said RGB signals of said pixels successively received from said original image storage means and said RGB signals of said pixels successively received from said lookup table, at mixing ratios for said pixels, respectively, and a mixing ratio computing unit for computing said mixing ratios;

said mixing ratio computing unit being operable to derive said separating distance in said perceived color space from Lab values of said color to be corrected and Lab values of said pixels in said original image successively received from said Lab conversion table, such that, when said separating distance is smaller than said distance used in designating said effective range, said pixels are determined to be subjected to said contrast correction processing, said mixing ratios being amended to diminish mixing quantities of said RGB output data from said lookup table with an increase in said separating distance, and when said separating distance is larger than said distance used in designating said effective range, said pixels are determined to be excluded from said contrast correction processing and said RGB output signals of said lookup table are set to zero.

5. An apparatus as defined in claim 4, wherein said mixing ratio computing unit is operable to execute selectively plural types of mixing ratio amendment processing having different modes of change in said mixing ratios depending on said separating distance in said perceived color space between Lab values of said color to be corrected and Lab values of said pixels in said original image, said mixing ratio computing unit including amendment selecting means for selecting one of said plural types of mixing ratio amendment processing.

6. An apparatus as defined in claim 1, further comprising display means for displaying said original image upon receipt of said RGB signals of said original image from said original image data storage means.

7. An apparatus as defined in claim 6, wherein said display means is operable to display said color designated by said processing condition designating means to be corrected and to act as a central object for contrast correction processing, in super-position in a predetermined region of a screen displaying said original image.

8. An apparatus as defined in claim 6, wherein said processing condition designating means is operable to designate said color to be corrected, with pixels in said original image displayed on said display means, and to extract said RGB signals of said color to be corrected from said original image data storage means based on addresses of said pixels used in designating said color to be corrected.

9. An apparatus as defined in claim 8, wherein said processing condition designating means is operable to extract said RGB signals of said pixels used in designating said color to be corrected and of adjacent pixels from said original image data storage means based on the addresses of said pixels used in designating said color to be corrected, and to adopt averages of said RGB signals as RGB signals of said color to be corrected.

10. An apparatus for correcting contrast of a particular region selected from an original image, comprising:

original image data storage means for storing RGB signals which are digitized three primary signals of pixels in said original image;

an HSL conversion table of converting said RGB signals to values of hue (H), saturation (S) and lightness (L) which are three attributes of perceived color;

processing condition designating means for designating a color to be corrected and to act as a central object of contrast correction processing, for designating effective ranges of the contrast correction processing with HSL values and with references to said color to be corrected, and for designating a characteristic parameter for the contrast correction processing;

a lookup table assigned to each of said RGB signals for contrast correction of said pixels in said original image, for storing RGB output data resulting from a contrast correction, in relation to RGB input data of said RGB signals applied as addresses;

lookup table initializing means for setting said RGB output data corresponding to said RGB input data to said lookup table, such that input and output values match for RGB output data pairing with RGB input data corresponding to said color to be corrected, and that data derived from said characteristic parameter with reference to a matching point between said RGB input data and said RGB output data relating to said color to be corrected are set for RGB output data corresponding to other RGB input data; and output control means for deriving differences, respectively, between HSL values of said color to be corrected and HSL values of said pixels in said original image successively received from said HSL conversion table, said output control means being operable, when said differences are smaller than said effective ranges, respectively, to determine said pixels to be subjected to said contrast correction processing and validate said RGB output data from said lookup table, and when any one of said differences is larger than a corresponding one said effective ranges, to determine said pixels to be excluded from said contrast correction processing and output said RGB signals of said original image intact, wherein said processing condition designating means is operable to designate a gradient of an input/output conversion characteristic expressed by a linear expression of said lookup table, as said characteristic parameter for the contrast correction processing.

11. An apparatus as defined in claim 10, wherein said processing condition designating means is operable to designate said color to be corrected with numerical values of said RGB signals.

12. An apparatus as defined in claim 10, wherein said lookup table initializing means is operable to obtain an input/output conversion characteristic equation expressed by a linear expression having said gradient designated by said processing condition designating means and extending through said matching point between said RGB input data and said RGB output data relating to said color to be corrected, to obtain output data by successively substituting input data into said input/output conversion characteristic equation, and to set said output data in relation to said input data.

13. An apparatus as defined in claim 10, wherein said output control means includes a mixing processor for mixing said RGB signals of said pixels successively received from said original image storage means and said RGB signals of said pixels successively received from said lookup table, at mixing ratios for said pixels, respectively, and a mixing ratio computing unit for computing said mixing ratios;

said mixing ratio computing unit being operable to derive said differences from HSL values of said color to be corrected and HSL values of said pixels in said original image successively received from said HSL conversion table, such that, when said differences are smaller than said effective ranges, respectively, said pixels are determined to be subjected to said contrast correction processing, said mixing ratios being amended to diminish mixing quantities of said RGB output data from said lookup table with an increase in each of said differences, and when any one of said differences is larger than a corresponding one of said effective ranges, said pixels are determined to be excluded from said contrast correction processing and said RGB output signals of said lookup table are set to zero.

14. An apparatus as defined in claim 13, wherein said mixing ratio computing unit is operable to execute selectively plural types of mixing ratio amendment processing having different modes of change in said mixing ratios depending on said differences between HSL values of said color to be corrected and HSL values of said pixels in said original image, respectively, said mixing ratio computing unit including amendment selecting means for selecting one of said plural types of mixing ratio amendment processing.

15. An apparatus as defined in claim 10, further comprising display means for displaying said original image upon receipt of said RGB signals of said original image from said original image data storage means.

16. An apparatus as defined in claim 15, wherein said display means is operable to display said color designated by said processing condition designating means to be corrected and to act as a central object for contrast correction processing, in super-position in a predetermined region of a screen displaying said original image.

17. An apparatus as defined in claim 15, wherein said processing condition designating means is operable to designate said color to be corrected, with pixels in said original image displayed on said display means, and to extract said RGB signals of said color to be corrected from said original image data storage means based on addresses of said pixels used in designating said color to be corrected.

18. An apparatus as defined in claim 17, wherein said processing condition designating means is operable to extract said RGB signals of said pixels used in designating said color to be corrected and of adjacent pixels from said original image data storage means based on the addresses of said pixels used in designating said color to be corrected, and to adopt averages of said RGB signals as RGB signals of said color to be corrected.

* * * * *